United States Patent [19]

Shackleton et al.

[11] Patent Number: 5,410,358
[45] Date of Patent: Apr. 25, 1995

[54] METHOD AND DEVICE FOR FRAME INTERPOLATION OF A MOVING IMAGE

[75] Inventors: Mark A. Shackleton; William J. Welsh, both of Suffolk, England; Atsushi Koike; Masahide Kaneko, both of Tokyo, Japan; Yoshinori Hatori, Kawasaki, Japan

[73] Assignees: British Telecommunications public limited company, London, England; Kokusai Denshin Denwa Co. (KDD), Tokyo, Japan; a part interest

[21] Appl. No.: 185,833
[22] PCT Filed: Jul. 22, 1992
[86] PCT No.: PCT/GB92/01344
  § 371 Date: Mar. 24, 1994
  § 102(e) Date: Mar. 24, 1994
[87] PCT Pub. No.: WO93/02529
  PCT Pub. Date: Feb. 4, 1993

[30] Foreign Application Priority Data
Jul. 23, 1991 [GB] United Kingdom ................ 9115874
Jul. 23, 1991 [GB] United Kingdom ................ 9115883

[51] Int. Cl.⁶ ............................................. H04N 7/01
[52] U.S. Cl. ................................. 348/459; 348/441; 348/699
[58] Field of Search ............... 348/441, 459, 14, 15, 348/699, 700, 701, 702, 443, 447; H04N 7/01

[56] References Cited

U.S. PATENT DOCUMENTS

| | | |
|---|---|---|
| 4,600,919 | 7/1986 | Stern . |
| 4,651,207 | 3/1987 | Bergmann et al. . |
| 4,668,986 | 5/1987 | Furukawa . |
| 4,672,442 | 6/1987 | Yamaguchi et al. . |
| 4,862,267 | 8/1989 | Gillard et al. . |
| 4,980,762 | 12/1990 | Heeger et al. . |
| 5,055,925 | 10/1991 | Lamnabhi .................... 348/441 X |

(List continued on next page.)

FOREIGN PATENT DOCUMENTS

| | | |
|---|---|---|
| 0388187 | 9/1990 | European Pat. Off. . |
| 3704777C1 | 2/1987 | Germany . |
| 1-59729 | 3/1989 | Japan . |
| 2144301 | 2/1985 | United Kingdom . |

OTHER PUBLICATIONS

Duffy et al, "A Knowledge Based Approach to Image Coding", Signal Processng IV: Theories and Applications Proceedings of Eusipco-88 Fourth European Signal Processing Conference, 5-18 Sep. 1988, vol., 3, pp. 1125-1128.
Aizawa et al, "Model-Based Synthesis Image Coding (List continued on next page.)

Primary Examiner—Victor R. Kostak
Attorney, Agent, or Firm—Nixon & Vanderhye

[57] ABSTRACT

Apparatus and method for forming an interpolated image corresponding to a given temporal distance ratio between a first and a second image including respectively, a first image in which the first and second images include a first and a second 3-D shape model of an object having respective shading values and that there is a 3-D motion vector defining the transformation between the first and the second 3-D shape models. The method includes: a) adjusting the interpolation 3-D motion vector (Vab) to obtain an interpolation 3-D motion vector (vi); b) forming an interpolation 3-D shape model (Mi) from the interpolation 3-D motion vector (Vi) and either the first or the second 3-D shape model (Ma,Mb); and c) forming an interpolation image from the interpolation 3-D shape model and the image shaping values from the first and second 3-D shape models. The invention provides a method and apparatus for frame interpolation of a moving image which remedies block-shaped distortion in interpolated frames, and which can reproduce smooth movement even when the input image includes movement in 3-dimensional space.

18 Claims, 9 Drawing Sheets

U.S. PATENT DOCUMENTS 5,057,921  10/1991  Robert et al. .......................... 348/459
5,060,064  10/1991  Lamnabhi et al. .................... 348/459
5,117,287  5/1992   Koike et al. .
5,162,907  11/1992  Keating et al. .................. 348/441 X
5,173,865  12/1992  Koike et al. .

OTHER PUBLICATIONS

System–Modeling a Person's Face and Synthesis of Facial Expressions" Conference Record of the IEEE/IEICE Global Telecommunications Conference, 1987, edited by IEEE (New York), vol. 1, Nov. 15–18, Tokyo, pp. 45–49.

Harashima et al, "Model–Based Analysis Synthesis Coding of Videotelephone Images–Conception and Basic Study of Intelligent Image Coding", Transactions of the Institute of Electronics and Communication, vol. E72, No. 5, 30 May 1989, Tokyo, pp. 452–459.

Forchheimer et al, "Image Coding–From Waveforms to Animation", IEEE Transactions on Acoustics, Speech, and Signal Processing 37, Dec. 1989, No. 12, New York, pp. 2008–2023.

Aizawa et al, "A Model–Based Anaylsis/Synthesis Image Coding Scheme", Electronics and Communications in Japan, Apr., 1990, Part I, New York, pp. 1–3.

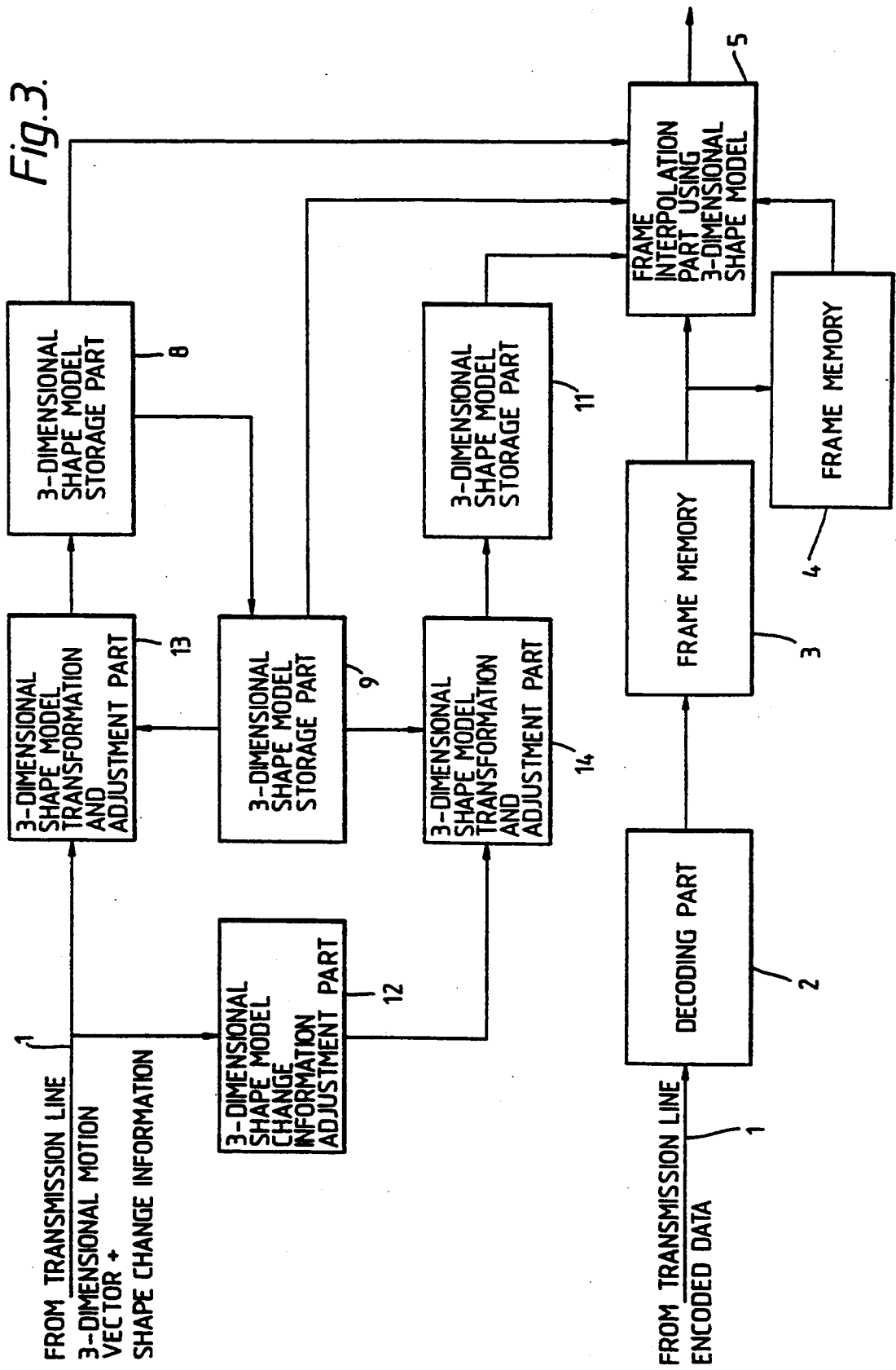

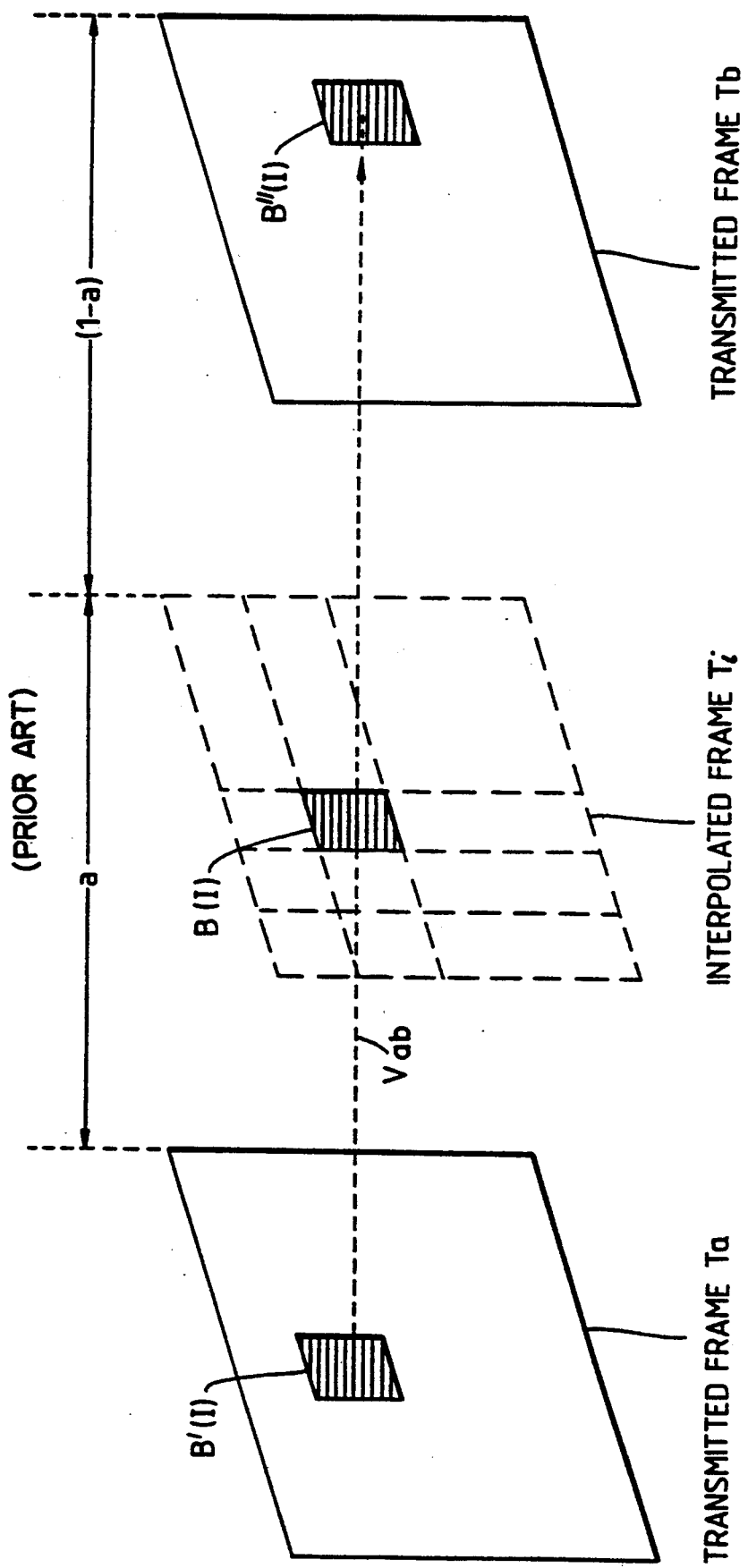

METHOD AND DEVICE FOR FRAME INTERPOLATION OF A MOVING IMAGE

BACKGROUND OF THE INVENTION

1. Field of the Invention

This invention relates to the frame interpolation of a moving image namely to a method and device for interpolating frames intermediate transmitted frames. The invention finds particular, but not exclusive, application to the transmission of moving images (e.g., in videophone systems).

2. Related Art

In the communication of a moving image at low bit rates for purposes such as videophone services, the necessity of making considerable cuts in the amount of information to be transmitted has frequently led to the adoption of techniques in which there is a reduction in the transmitted frame rate. However, when the frame rate is low, intermediate frames must be generated to provide a continuous image at the receiver. The intermediate frames can be obtained by repeating frames or preferably by attempting to obtain intermediate frames by interpolating from the received frames. This is illustrated in FIG. 8. A transmitter side transmits image frames Ta and Tb which are two temporally separated images of a moving input image. Frames Ta and Tb are received at a receiver side. An intermediate frame Ti is found by interpolating between frames Ta and Tb in order to produce an moving output image comprising three frames Ta, Ti and Tb instead of simply the two frames Ta and Tb.

When it is necessary to interpolate many frames between received frames it can be difficult to reproduce smooth movement at the receiver side. One known approach to solving this problem is to use motion vectors detected from the frames Ta and Tb, in the FIG. 8 example, to interpolate the missing frames at the receiver side.

In order to carry out such a method of frame interpolation of a moving image without giving rise to blurring or jerkiness, it is necessary to detect motion vectors which are visually correct. Methods which have been proposed for detecting motion vectors include:

(i) the method which takes the motion vector as the displacement giving the smallest predicted error power between frames; and (ii) the gradient method which uses the temporal and spatial gradients of the pixel values.

In these methods, the detection range is restricted to a 2-dimensional plane. Moreover, the unit of detection is frequently comparatively small for example a rectangular block 8 pixels×8 lines. An explanation will now be given of such a frame interpolation system based on block units, the assumed application being to videophones.

Referring to FIGS. 9 and 10 a frame interpolation method is shown which is based on motion vector detection in rectangular block units. In FIG. 9, encoded data is received at a decoding part 2, the decoded frame being passed to first frame memory 3 after the previously decoded frame stored in this first frame memory 3 has been moved into a second frame memory 4. Motion vectors are also received at the receiver which with the frames in frame memories 2 and 3 are the used to interpolate an intermediate frame Ti as will now be described with reference to FIG. 10.

In FIG. 10, Ta is the frame which has been transmitted from the transmitter side at the immediately preceding point in time, Tb is the frame at the current point in time, and Ti is a frame which is to be interpolated between transmitted frames Ta and Tb. Consider that the frame to be interpolated is temporally spaced between the frames Ta and Tb in the ratio a: (1−a) as shown in FIG. 10.

The frames Ta and Tb are considered to be composed of blocks B'(I) and B'(I), respectively with a set of motion vectors Vab denoting the displacements of blocks B'(I) between frames Ta and Tb. This is illustrated in FIG. 10.

A block B(I) of the interpolated frame Ti is obtained by the interpolation part 5 of FIG. 9 by means of the following equation:

$$B(I) = a \times B'(I) + (1-a) * B''(I)$$

where, blocks B'(I) and B''(I) are linked by the motion vector Vab associated with the block B'(I).

A detailed description of a specific method may be found in an article by Wada: Masahiro WADA, "System for motion-compensated frame interpolation of colour moving image signals", *Denshi Joho Tsushin Gakkai Ronbunshi*, (B-I), Vol. J72 B I, No. 5, pp. 446–455.

U.S. Pat. No. 4,672,442 published on 9th Jun. 1987 describes a moving picture frame rate conversion system which converts the first picture signal with a first frame rate into a second picture signal with a second frame rate which differs from the first frame rate by generating an interpolation frame between two consecutive frames of the first picture signal. In this method the interpolation frame is generated by using a first picture block on the first frame and a second picture block on a second frame of the first picture signal and the second picture block is moved in position relative to the first picture block.

The prior art which has been presented is a frame interpolation method for a moving image which is based on the detection, in block units, of motion vectors in a 2-dimensional plane. However, the following problems are encountered with such a method. In conventional frame interpolation methods, the unit of motion vector detection is a block rather than a subject. Accordingly, block-shaped distortions will occur in interpolated frames if the motion vector detection in respect of one and the same body gives uneven results. Moreover, because motion vector detection is restricted to a 2-dimensional plane, it is difficult to achieve accurate detection of the motion vectors of a body which essentially includes movement in 3-dimensional space. For this reason, it is impossible to reproduce smoothly-moving images which correspond to the input images in such circumstances by the prior art methods of interpolation.

An article by Forchheimer and Kronander, titled "Image Coding—From Wave Forms to Animation" IEEE Acoustics, Speech, and Signal Processing Magazine, vol. 37 no. 12 30th Dec. 1989, pages 2003-2023 describes a method of coding face images in which a wire frame model of a face is transmitted and the surface face image synthesized assuming matte surface and one light source. Parameters are identified which indicate how the wire frame model is to move which determine at the receiver how the wire frame model of the face of the receiver is to move in order to provide a moving synthesized face image.

BRIEF SUMMARY OF THE INVENTION

This invention is intended to solve the foregoing problems of the prior art. Its object is to provide a method and device for frame interpolation of a moving image which remedies block-shaped distortion in interpolated frames, and which is better able to reproduce smooth movement even when the input image includes movement in 3-dimensional space.

According to a first aspect of the present invention a method of forming an interpolated image corresponding to a given temporal distance ratio between a first and a second image is characterised in that:

the first and second images include a first and a second 3-D shape model of an object having respective shading values and that there is a 3-D motion vector defining the transformation between the first and the second 3-D shape models, and in that the method comprises:

a) adjusting the interpolation 3-D motion vector (Vab) to obtain an interpolation 3-D motion vector (Vi);

b) forming an interpolation 3-D shape model (Mi) from the interpolation 3-D motion vector (Vi) and either the first or the second 3-D shape model (Ma, Mb); and c) forming an interpolation image from the interpolation 3-D shape model and the image shaping values from the first and second 3-D shape models.

According to a second aspect of the present invention apparatus for forming an interpolated image corresponding to a given temporal distance ratio between a first and a second image is characterised in that:

the first and second images include a first and a second 3-D shape model of an object having respective shading values and that there is a 3-D motion vector defining the transformation between the first and the second 3-D shape models, and in that the apparatus comprises:

a) a 3-D motion vector adjustment means (6) for adjusting the interpolation 3-D motion vector (Vab) to obtain an interpolation 3-D motion vector (Vi);

b) a first shape model transformation means (10) for forming an interpolation 3-D shape model (Mi) from the interpolation 3-D motion vector (Vi) and either the first or the second 3-D shape model (Ma, Mb)b) a first shape model transformation means for forming an interpolation 3-D shape model from the interpolation, on 3-D motion vector and the first 3-D shape model; and c) a frame interpolation means for forming an interpolation image from the interpolation 3-D shape model and the image shading values from the first and second 3-D shape models.

The second 3-D shape model may be obtained by applying the 3-D motion vector to the first 3-D shape model or, conversely, the 3-D motion vector can be derived at a receiver from received first and second 3-D shape models, by appropriate means.

Such apparatus may further include a second 3-D shape model transformation means for forming the second interpolation 3-D shape model from the interpolation 3-D motion vector and the first 3-D shape model.

Conveniently, such apparatus includes one 3-D shape model storage means corresponding to, and for storing, a respective one of the 3-D shape models.

Preferably, such apparatus includes:

a shape change information adjustment means responsive to the information on subject element shape changes which has been transmitted from the transmitter side, and to the temporal distance ratio between the previous and current frames and the interpolated frame, to provide the changes in subject element shapes between the previous frame and the interpolated frame;

an element shape change adjustment means which provides a 3-dimensional shape model that corresponds to the position and orientation and also to the element shapes of the subject of the current frame; and an element shape change adjustment means which provides a 3-dimensional shape model that corresponds to the position and orientation and also to the element shapes of the subject of the interpolated frame.

Apparatus as just described may have shape change adjustment means which operates by:

(i) causing the 3-dimensional motion vector between the previous frame and the current frame to operate upon the 3-dimensional shape model of the previous frame; and (ii) causing the information on element shape changes between the previous frame and the current frame, said information having been transmitted from the transmitter side, to operate upon the latter stage of the aforementioned 3-dimensional shape model transformation process which transforms the 3-dimensional shape model of the previous frame.

Such apparatus may have an element shape change adjustment means which operates by:

(i) causing the 3-dimensional motion vector between the previous frame and the interpolated frame, which motion vector has been obtained in the 3-dimensional motion vector adjustment process, to operate upon the 3-dimensional shape model of the previous frame; and (ii) causing the information on element shape changes between the previous frame and the interpolated frame, which information has been obtained in the aforementioned shape change information adjustment process, to operate upon the latter stage of the aforementioned 3-dimensional shape model transformation process which transforms the 3-dimensional shape model of the previous frame.

BRIEF DESCRIPTION OF THE DRAWINGS

An embodiment of the invention and its method of operation will now be described in more detail, by way of example only, with reference to the accompanying drawings of which:

FIG. 3 is a block diagram of device for frame interpolation of a moving image using a 3-dimensional shape model, and represents a second embodiment of this invention;

FIG. 10 is a schematic diagram explaining frame interpolation based on conventional block units.

DETAILED DESCRIPTION OF EXEMPLARY EMBODIMENTS OF THE INVENTION

Figure 1:
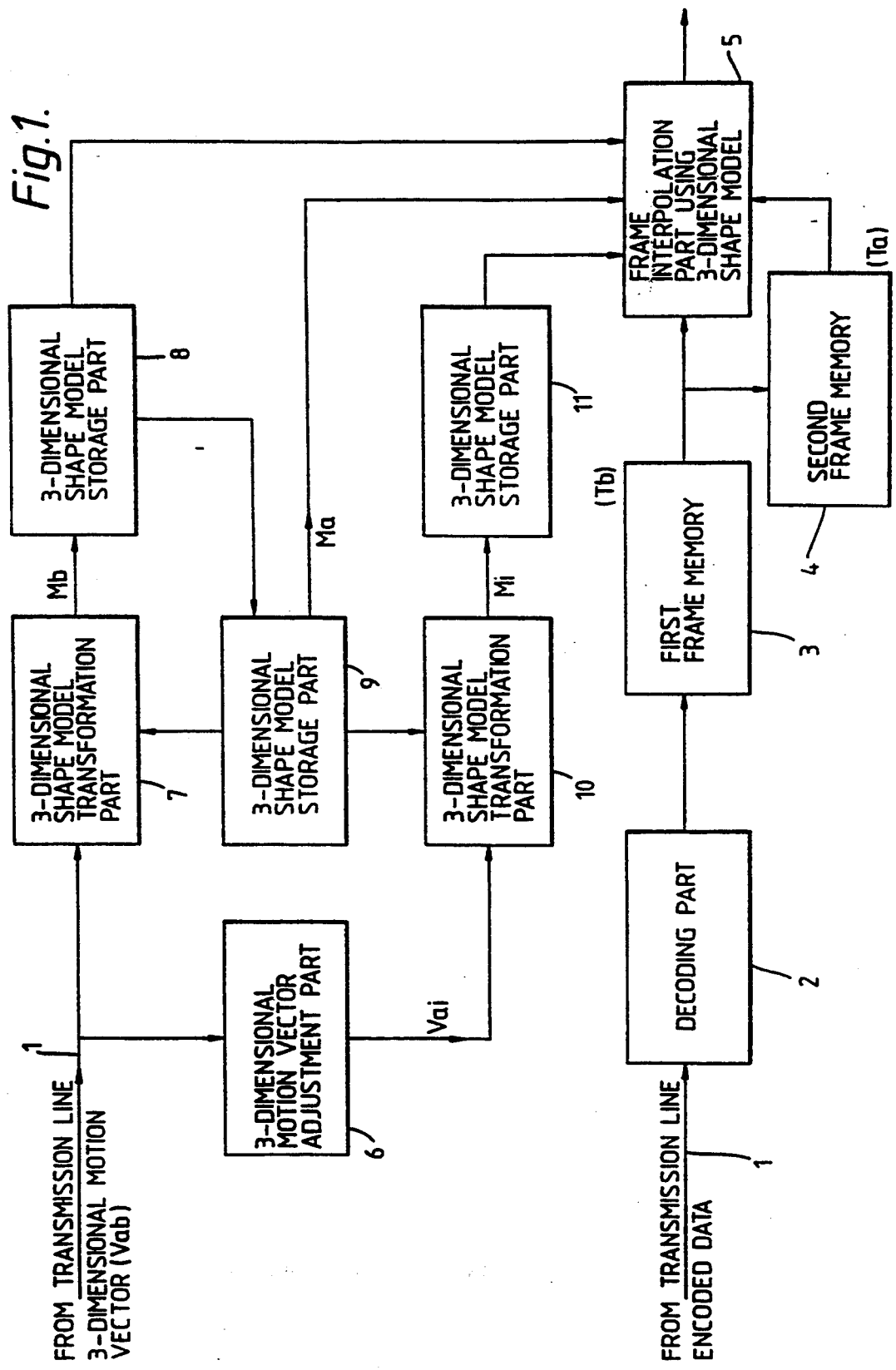
FIG. 1 is a block diagram of device for frame interpolation of a moving image using a 3-dimensional shape model, and represents a first embodiment of this invention.
Figure 6:
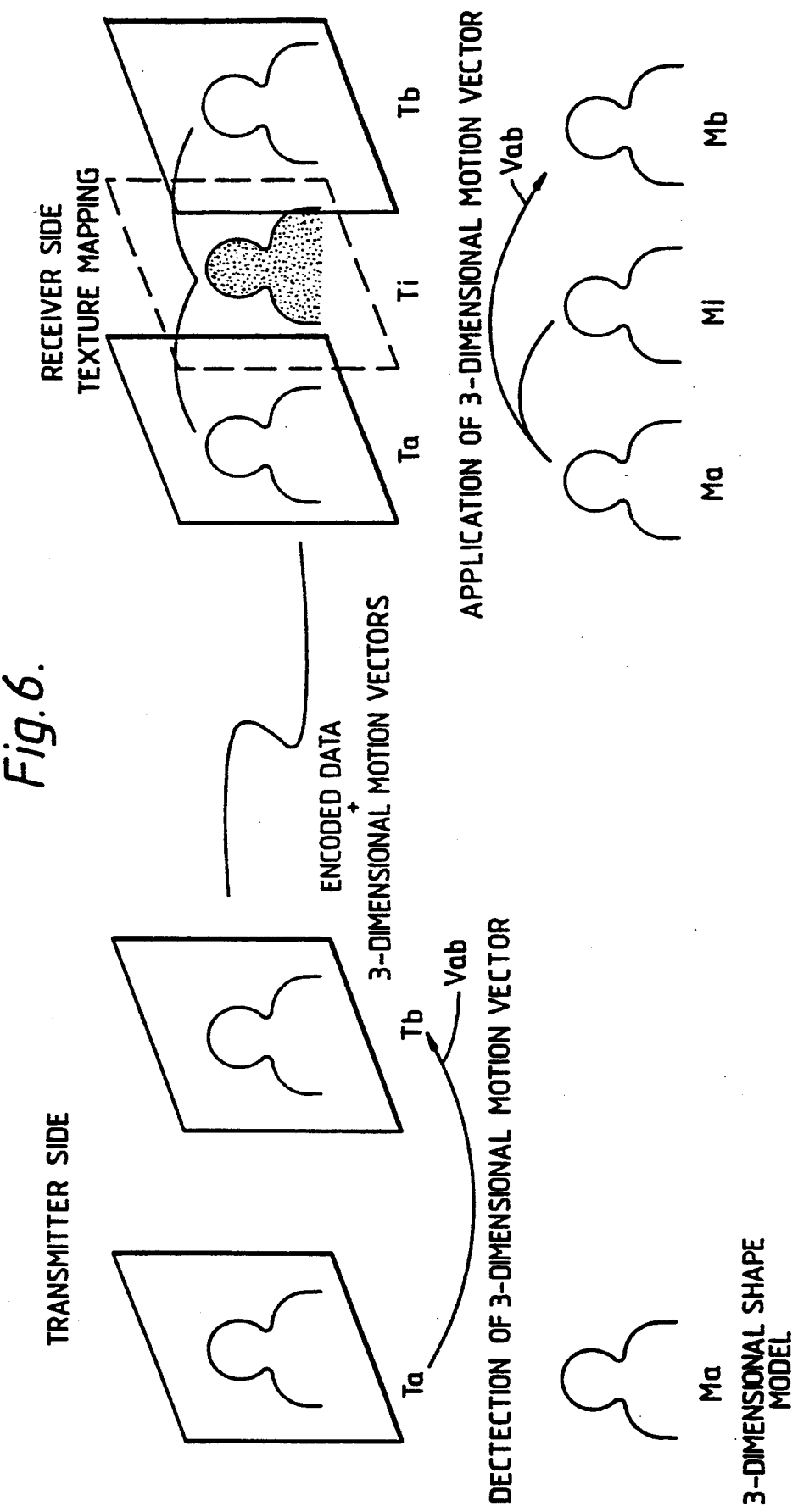
FIG. 6 is a schematic diagram explaining frame interpolation of a moving image using a 3-dimensional shape model.
Figure 9:
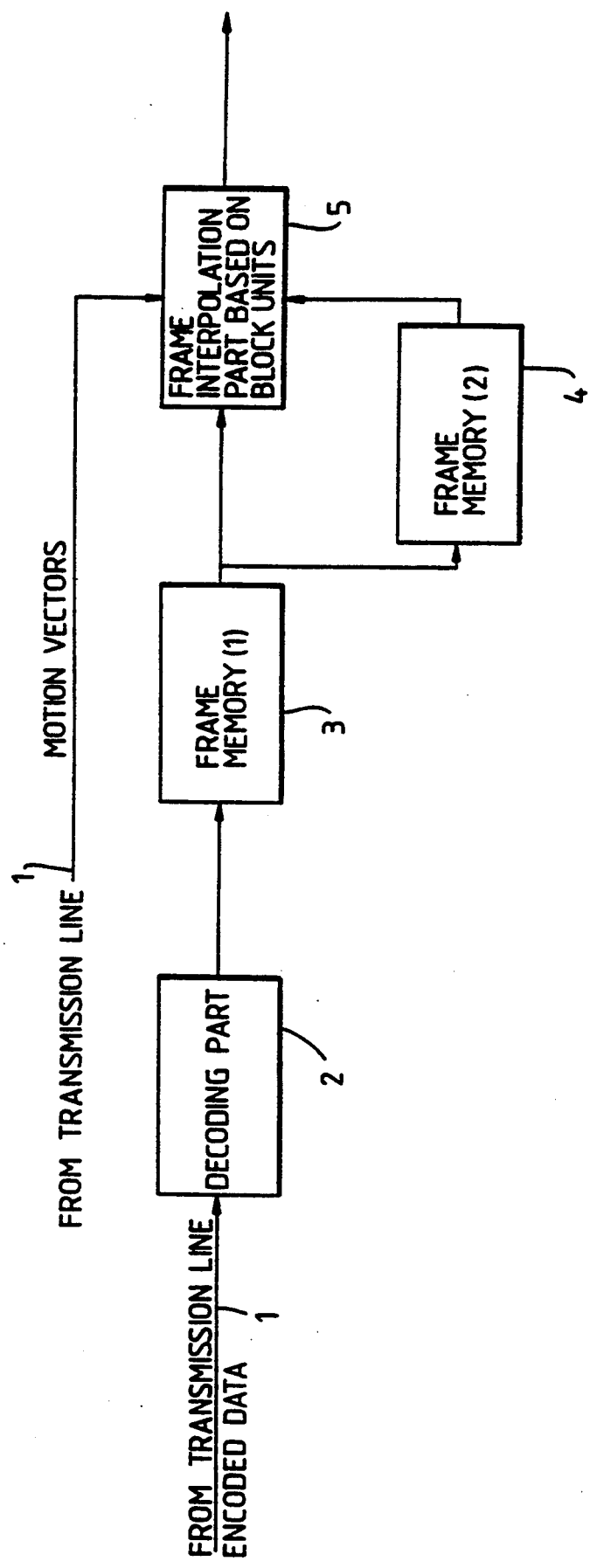
FIG. 9 is a schematic block diagram relating to conventional frame interpolation of a moving image.

In FIG. 1, 5 is a frame interpolation part using a 3-dimensional shape model, 6 is a 3-dimensional motion vector adjustment part, 7 and 10 are 3-dimensional shape model transformation parts, and 8, 9 and 11 are 3-dimensional shape model storage parts. The remainder of this Figure is the same as already described with reference to FIG. 9. The method of operation of this embodiment will now be explained by way of the example of a videophone, i.e., where the moving image is a face and with additional reference to FIGS. 6 and 7.

Figure 7:
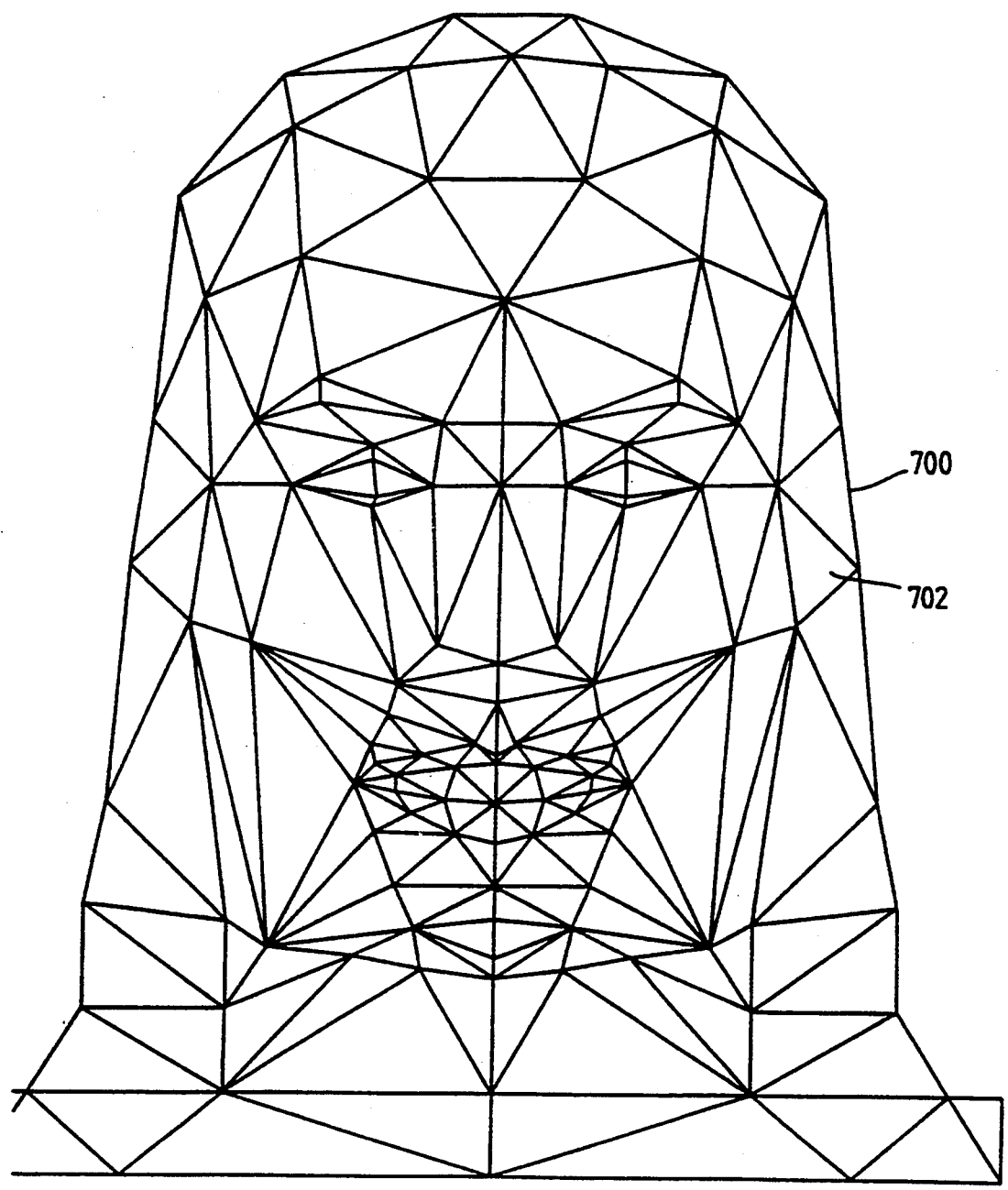
FIG. 7 is a drawing of an example of a 3-dimensional shape model of a head.
Figure 8:
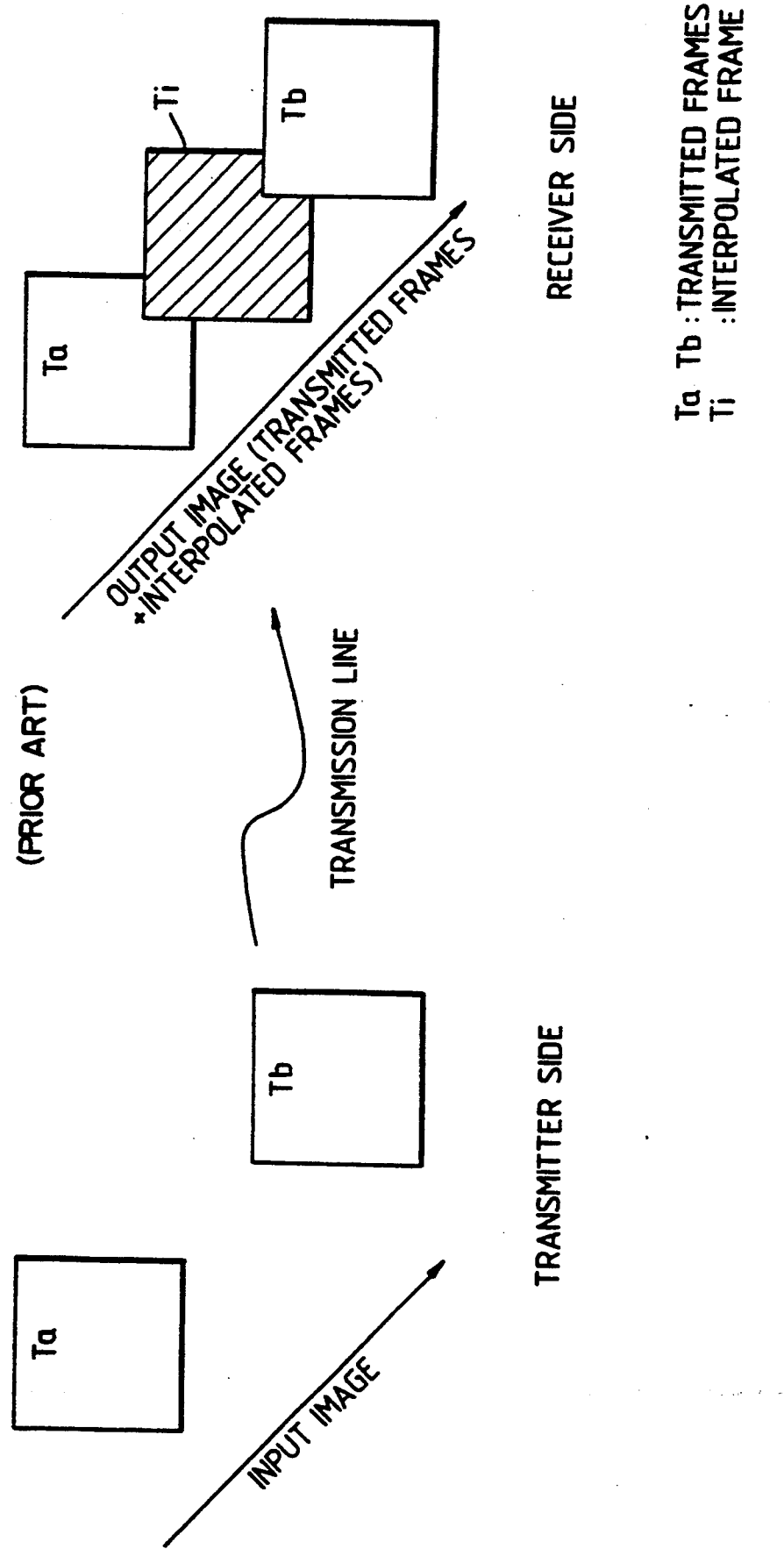
FIG. 8 is a schematic diagram explaining frame interpolation of a moving image.

FIG. 7 is an example of a 3-dimensional shape model which represents a head shape, As is shown in this figure, the 3-dimensional shape model M comprises a wire frame model 700 with which surface shape is represented using a plurality of triangles of which only one, 702, is referenced.

Again let the interpolated frame be Ti and the preceding and present transmitted frames be Ta and Tb, respectively. It will be assumed that the image in transmitted frame Ta and a 3-dimensional shape model Ma of a shape in frame Ta have already been stored in the first frame memory 4 and the 3-dimensional shape model storage part 9, respectively.

Encoded data which has been transmitted from the transmitter side by way of input terminal 1 is decoded at the decoding part 2, thereby yielding an image (comprising brightness and colour information, hereinafter referred to simply as "shading information") at the current point in time (i.e., corresponding to transmitted frame Tb). This shading information is stored in the first frame memory 3, and subsequently sent to the frame interpolation part 5 together with the shading information pertaining to the immediately preceding frame (i.e., transmitted frame Ta) which has been read out from the second frame memory 4. In parallel with this, in the 3-dimensional shape model transformation part 7, the 3-dimensional shape model Ma in transmitted frame Ta, which has been read out from 3-dimensional shape model storage part 9, is transformed using a 3-dimensional motion vector Vab between transmitted frame Ta and transmitted frame Tb, said vector having been sent from the transmitter side. In this way, a 3-dimensional shape model Mb which corresponds to the transmitted frame Tb is obtained. In the 3-dimensional motion vector adjustment part 6, a 3-dimensional motion vector Vai between transmitted frame Ta and interpolated frame Ti is estimated using the relative temporal distance "a" between transmitted frames Ta and Tb and interpolated frame Ti. In general, if it is assumed that the 3-dimensional motion vector v of the shape between transmitted frames Ta and Tb varies linearly with time, then the 3-dimensional motion vector Vai between transmitted frame Ta and interpolated frame Ti can be obtained by multiplying Vab by the relative temporal distance ratio.

A 3-dimensional shape model Mi which corresponds to interpolated frame Ti is then obtained by using the Vai motion vector to transform the 3-dimensional shape model Ma of transmitted frame Ta. The 3-dimensional shape model Mi could also be obtained by using a Vbi motion vector to transform the 3-dimensional shape model Mb of transmitted frame Tb in an analogous fashion.

The shading information in interpolated frame Ti is then interpolated in frame interpolation part 5 using:

(i) the shading information in the transmitted frames Ta and Tb;
(ii) the 3-dimensional shape models Ma and Mb; and
(iii) the 3-dimensional shape model Mi in interpolated frame Ti; these three items having been obtained by the aforementioned processing.

Figure 2:
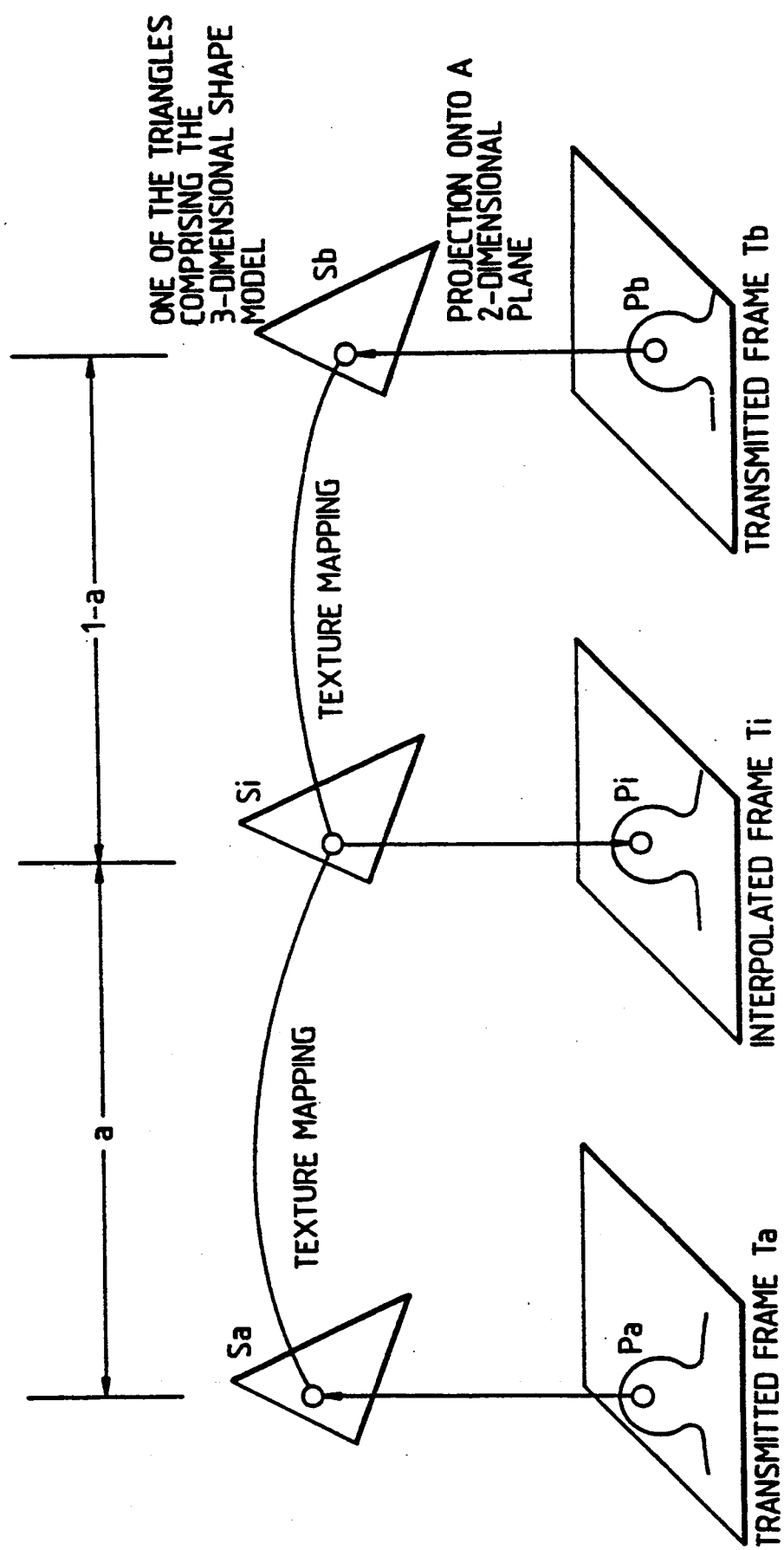
FIG. 2 is a schematic diagram explaining the function of the frame interpolation part in FIG. 1.

An explanation will now be given of frame interpolation part 5 with reference to FIG. 2. As is shown in this figure, the basis of frame interpolation using a 3-dimensional shape model according to the present invention is texture mapping, which is based on the correspondence relation of the triangles comprising the 3-dimensional shape models in interpolated frame Ti and in the preceding and succeeding transmitted frames Ta and TB.

Triangles Sa and Sb correspond to the same part of the 3-dimensional shape model representing the subject of frames Ta and Tb and pixels Pa and Pb to pixels representing corresponding parts of the triangles Sa and Sb, respectively.

Triangle Si of interpolated frame Ti equivalent to triangles Sa and Sb is texture mapped as follows.

Triangle Si is projected onto a 2-dimensional plane and pixel Pi of interpolated frame is obtained as follows. Pixels Pa and Pb corresponding to pixel Pi of interpolated frame Ti are then obtained from the correspondence relations among kindred triangles comprising the 3-dimensional shape models in transmitted frames Ta and Tb and in interpolated frame Ti. The shading values of these pixels Pi and Pb are then used to obtain the pixel value (shading value) of pixel Pi of the interpolated frame Ti by means of the following equation:

$$Pi = a^*Pa + (1-a)^*Pb$$

An image for the 3-dimensional shape model in interpolated frame Ti can then be interpolated by carrying out this processing on all the pixels contained in triangle Si and on all the triangles comprising the 3-dimensional shape model Mi of interpolated frame Ti. Furthermore, a conventional method can be applied to those regions (for example, to the background parts) where interpolation with a 3-dimensional shape model is not possible. In addition, although the number of interpolated frames has been taken as 1 in the foregoing explanation, it is also feasible to interpolate a plurality of frames by carrying out identical processing after changing the temporal distance ratio.

In the foregoing example and explanation, the 3-dimensional motion vector was obtained at the transmitter side. However, it is also possible to obtain the 3-dimensional motion vector of the subject by using image signals which have been decoded at the receiver side.

FIG. 3 is a block diagram of a device for frame interpolation of a moving image using a 3-dimensional shape model and is intended to explain a second embodiment of this invention. This second embodiment differs from the first embodiment in that it has been designed to be capable of responding to changes in the shape of the elements of the subject as well as to changes in the 3-dimensional motion vector of the subject.

In FIG. 3, 12 is a 3-dimensional shape model change information adjustment part, and 13 and 14 are 3-dimensional shape model transformation and adjustment parts. The remainder of this figure is identical to FIG. 1.

Figure 5:
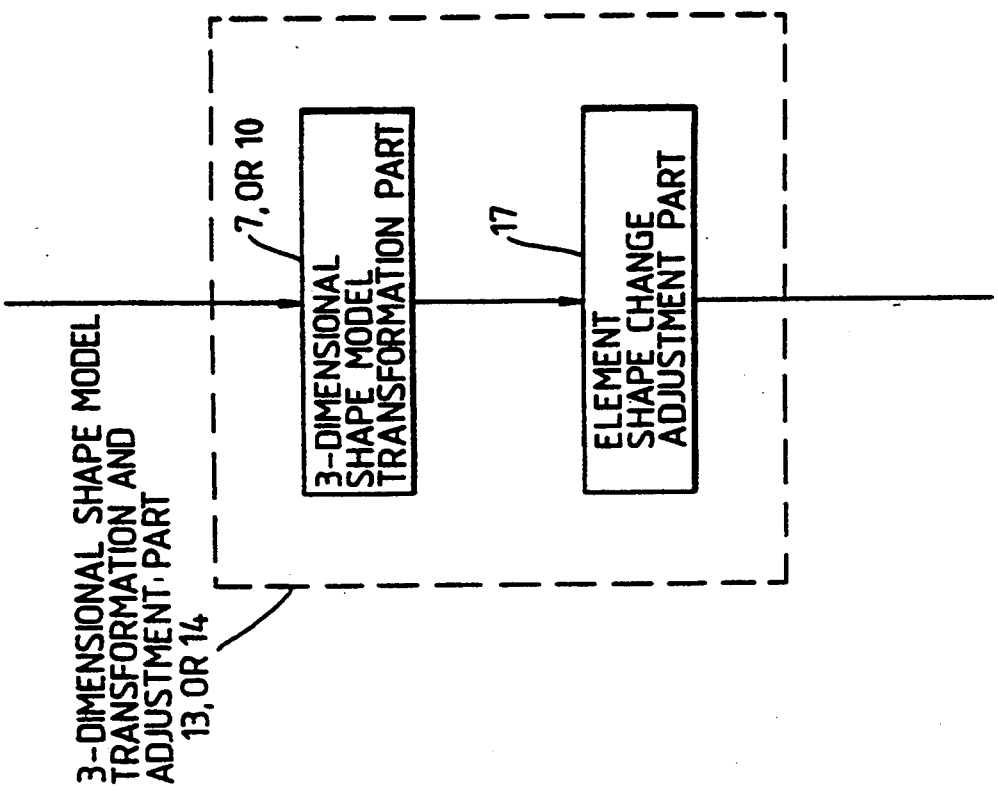
FIG. 5 is a schematic diagram relating to the 3-dimensional shape model transformation and adjustment parts in FIG. 3.
Figure 4:
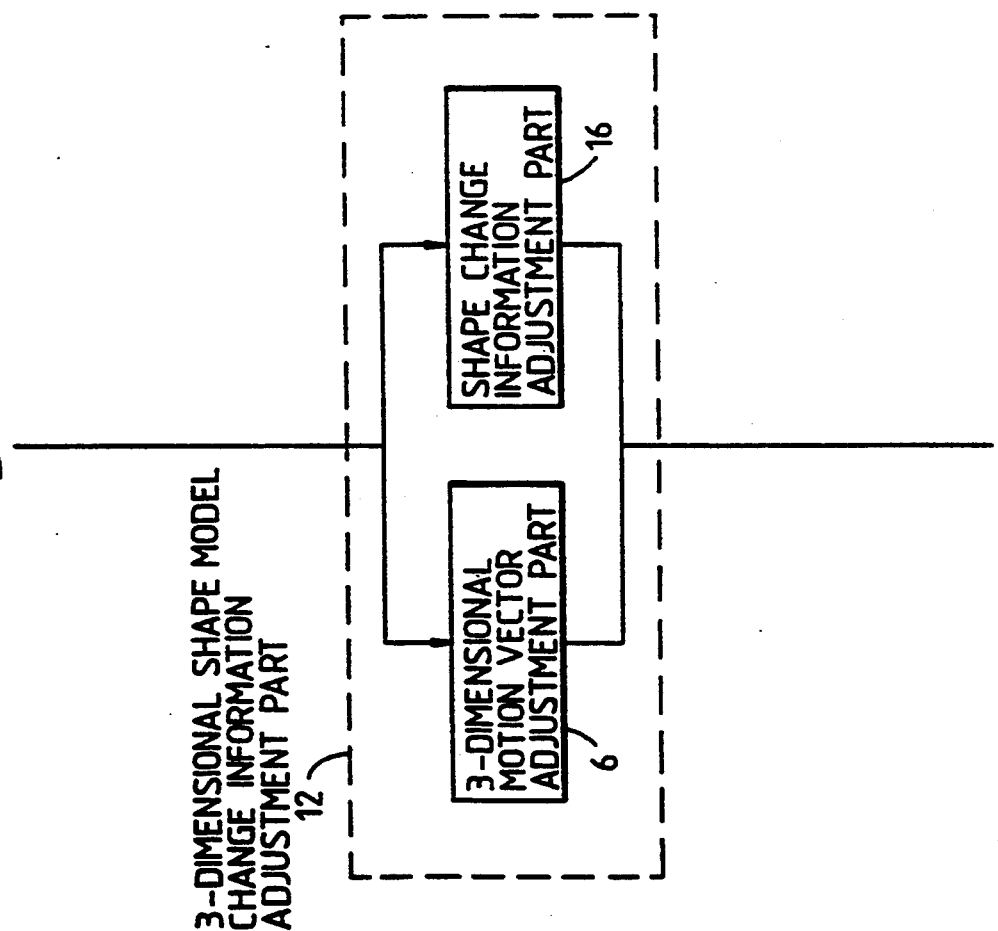
FIG. 4 is a schematic diagram relating to the 3-dimensional shape model change information adjustment part in FIG. 3.

As is shown in FIG. 4, a 3-dimensional shape model change information adjustment part 12 comprises a 3-dimensional motion vector adjustment part 6 and a newly added shape change information adjustment part 16. In addition, as shown in FIG. 5, 3-dimensional shape model transformation and adjustment parts 13 and 14 comprise, respectively, 3-dimensional shape model transformation parts 7 and 10, plus, newly added to the latter part of said parts 7 and 10, element shape change adjustment part 17.

In the shape change information adjustment part 16, information on element shape changes between two transmitted frames, said information having been transmitted from the transmitter side, is adjusted on the basis of the temporal distance ratio "a" between the interpolated frame and the preceding and succeeding transmitted frames, thereby yielding information on element shape changes between transmitted frame Ta and interpolated frame Ti. Shape changes between two transmitted frames are generally obtained on the assumption that they are linear. In element shape change adjustment part 17, a 3-dimensional shape model which corresponds to the shape of the subject of the interpolated frame is obtained by adjusting the element shapes of the 3-dimensional shape model which has been obtained in the 3-dimensional shape model transformation part, this being done on the basis of information on shape changes between transmitted frame Ta and the interpolated frame Ti, said information having been obtained by the shape change information adjustment part 16. In other words, a 3-dimensional shape model which corresponds to the position and orientation of the subject of the interpolated frame is obtained by means of a 3-dimensional motion vector, and, additionally, the information on element shape changes is used to adjust the shape of the elements of the 3-dimensional shape model so that it corresponds also to any changes in the shapes of the elements.

It will thus be seen that, by carrying out frame interpolation of a moving image using a 3-dimensional shape model, this invention is capable of preventing the block-shaped distortion generated in conventional methods.

Moreover, because the frame interpolation is carried out after using a 3-dimensional shape model to obtain 3-dimensional movement, movement which corresponds to the input image can be reproduced in the interpolated image, even if there is movement in 3-dimensional space in the input image. Furthermore, even when there are changes in the shapes of the elements contained in the subject, an interpolated image with natural movement can be obtained by transforming the 3-dimensional shape model in correspondence with these shape changes. As a result of these various features, this method is capable of reproducing interpolated images which reproduce movement that is closer to the input image than that achieved with the interpolated images obtained in conventional methods.

In respect of videophone and other systems where, in order to reduce the amount of transmitted information, the number of frames of a moving image has been reduced in the transmitter section, this invention can be applied to the frame interpolation of the moving image, whereby the frames which have been cut out are regenerated at the receiver section. It can also be applied to systems for converting TV signals with different frame rates, for example, for conversion from PAL to NTSC.

We claim:

1. A method of forming an interpolated image corresponding to a given temporal distance ratio between a first and a second image, the first and second images each including a first and a second 3-D shape model of an object having respective shading values and there being a 3-D motion vector defining the transformation between the first and the second 3-D shape models, said method comprising the steps of:
   a) adjusting the 3-D motion vector to obtain an interpolation 3-D motion vector;
   b) forming an interpolation 3-D shape model from the interpolation 3-D motion vector and either the first or the second 3-D shape model; and
   c) forming an interpolation image from the interpolation 3-D shape model and the image shaping values from the first and second 3-D shape models.

2. A method as in claim 1 in which the second 3-D shape model is obtained by applying the 3-D motion vector to the first 3-D shape model.

3. Apparatus for forming an interpolated image corresponding to a given temporal distance ration between a first and a second image, the first and second images each including a first and a second 3-D shape model of an object having respective shading values and there being a 3-4D motion vector defining the transformation between the first and the second 3-D shape models, said apparatus comprising:
   a) a 3-D motion vector adjustment means for adjusting the 3-D motion vector to obtain an interpolation 3-D motion vector;
   b) a first shape model transformation means for forming an interpolation 3-D shape model from the interpolation 3-D motion vector and either the first or the second 3-D shape model; and
   c) a frame interpolation means for forming an interpolation image from the interpolation 3-D shape model and the image shading values from the first and second 3-D shape models.

4. Apparatus as in claim 3 further including a second 3-D shape model transformation means for forming the second interpolation 3-D shape model from the interpolation 3-D motion vector and the first 3-D shape model.

5. Apparatus as in claim 3 in which there is included one 3-D shape model storage means corresponding to, and for storing, a respective one of the 3-D shape models.

6. Apparatus as in claim 3 and further including:
   a shape change information adjustment means responsive to the information on subject element shape changes which has been transmitted from the transmitter side, and to the temporal distance ratio between the previous and current frames and the interpolated frame, to provide the changes in subject element shapes between the previous frame and the interpolated frame;

an element shape change adjustment means which provides a 3-dimensional shape model that corresponds to the position and orientation and also to the element shapes of the subject of the current frame; and an element shape change adjustment means which provides a 3-dimensional shape model that corresponds to the position and orientation and also to the element shapes of the subject of the interpolated frame.

7. Apparatus as in claim 6 in which the element shape change adjustment means operates by:
(i) causing the 3-dimensional motion vector between the previous frame and the current frame to operate upon the 3-dimensional shape mode of the previous frame; and
(ii) causing the information on element shape changes between the previous frame and the current frame, said information having been transmitted from the transmitter side, to operate upon the latter stage of the aforementioned 3-dimensional shape model transformation process which transforms the 3-dimensional shape model of the previous frame.

8. Apparatus as in claim 6 in which the element shape change adjustment means operates by:
(i) causing the 3-dimensional motion vector between the previous frame and the interpolated frame, which motion vector has been obtained in the 3-dimensional motion vector adjustment process, to operate upon the 3-dimensional shape model of the previous frame; and
(ii) causing the information on element shape changes between the previous frame the interpolated frame, which information has been obtained in the aforementioned shape change information adjustment process, to operate upon the latter stage of the aforementioned 3-dimensional shape model transformation process which transforms the 3-dimensional shape model of the previous frame.

9. Apparatus as in claim 4 in which there is included one 3-D shape model storage means corresponding to, and for storing, a respective one of the 3-D shape models.

10. Apparatus as in claim 4 and further including:
a shape change information adjustment means responsive to the information on subject element shape changes which has been transmitted from the transmitter side, and to the temporal distance ratio between the previous and current frames and the interpolated frame, to provide the changes in subject element shapes between the previous frame and the interpolated frame;
an element shape change adjustment means which provides a 3-dimensional shape model that corresponds to the position and orientation and also to the element shapes of the subject of the current frame; and
an element shape change adjustment means which provides a 3-dimensional shape model that corresponds to the position and orientation and also to the element shapes of the subject of the interpolated frame.

11. Apparatus as in claim 10 in which the element shape change adjustment means operates by:
(i) causing the 3-dimensional motion vector between the previous frame and the current frame to operate upon the 3-dimensional shape model of the previous frame; and
(ii) causing the information on element shape changes between the previous frame and the current frame, said information having been transmitted from the transmitter side, to operate upon the latter stage of the aforementioned 3-dimensional shape model transformation process which transforms the 3-dimensional shape model of the previous frame.

12. Apparatus as in claim 10 in which the element shape change adjustment means operates by:
(i) causing the 3-dimensional motion vector between the previous frame and the interpolated frame, which motion vector has been obtained in the 3-dimensional motion vector adjustment process, to operate upon the 3-dimensional shape model of the previous frame; and
(ii) causing the information on element shape changes between the previous frame and the interpolated frame, which information has been obtained in the aforementioned shape change information adjustment process, to operate upon the latter stage of the aforementioned 3-dimensional shape model transformation process which transforms the 3-dimensional shape model of the previous frame.

13. Apparatus as in claim 5 and further including:
a shape change information adjustment means responsive to the information on subject element shape changes which has been transmitted from the transmitter side, and to the temporal distance ratio between the previous and current frames and the interpolated frame, to provide the changes in subject element shapes between the previous frame and the interpolated frame;
an element shape change adjustment means which provides a 3-dimensional shape model that corresponds to the position and orientation and also to the element shapes of the subject of the current frame; and
an element shape change adjustment means which provides a 3-dimensional shape model that corresponds to the position and orientation and also to the element shapes of the subject of the interpolated frame.

14. Apparatus as in claim 13 in which the element shape change adjustment means operates by:
(i) causing the 3-dimensional motion vector between the previous frame and the current frame to operate upon the 3-dimensional shape model of the previous frame; and
(ii) causing the information on element shape changes between the previous frame and the current frame, said information having been transmitted from the transmitter side, to operate upon the latter stage of the aforementioned 3-dimensional shape model transformation process which transforms the 3-dimensional shape model of the previous frame.

15. Apparatus as in claim 13 in which the element shape change adjustment means operates by:
(i) causing the 3-dimensional motion vector between the previous frame and the interpolated frame, which motion vector has been obtained in the 3-dimensional motion vector adjustment process, to operate upon the 3-dimensional shape model of the previous frame; and
(ii) causing the information on clement shape changes between the previous frame and the interpolated frame, which information has been obtained in the aforementioned shape change information adjustment process, to operate upon the latter stage of the aforementioned 3-dimensional shape model transformation process which transforms the 3-dimensional shape model of the previous frame.

16. Apparatus as in claim 7 in which the element shape change adjustment means operates by:
 (i) causing the 3-dimensional motion vector between the previous frame and the interpolated frame, which motion vector has been obtained in the 3-dimensional motion vector adjustment process, to operate upon the 3-dimensional shape model of the previous frame; and
 (ii) causing the information on element shape changes between the previous frame and the interpolated frame, which information has been obtained in the aforementioned shape change information adjustment process, to operate upon the latter stage of the aforementioned 3-dimensional shape model transformation process which transforms the 3-dimensional shape model of the previous frame.

17. Apparatus as in claim 11 in which the element shape change adjustment operates by:
 (i) causing the 3-dimensional motion vector between the previous frame and the interpolated frame, which motion vector has been obtained in the 3-dimensional motion vector adjustment process, to operate upon the 3-dimensional shape model of the previous frame; and
 (ii) causing the information on element shape changes between the previous frame and the interpolated frame, which information has been obtained in the aforementioned shape change information adjustment process, to operate upon the latter stage of the aforementioned 3-dimensional shape model transformation process which transforms the 3-dimensional shape model of the previous frame.

18. Apparatus as in claim 14 in which the element shape change adjustment means operates by:
 (i) causing the 3-dimensional motion vector between the previous frame and the interpolated frame, which motion vector has been obtained in the 3-dimensional motion vector adjustment process, to operate upon the 3-dimensional shape model of the previous frame; and
 (ii) causing the information on element shape changes between the previous frame and the interpolated frame, which information has been obtained in the aforementioned shape change information adjustment process, to operate upon the latter stage of the aforementioned 3-dimensional shape model transformation process which transforms the 3-dimensional shape model of the previous frame.

* * * * *